United States Patent [19]

Kasahara

[11] 3,977,731
[45] Aug. 31, 1976

[54] FLUID PRESSURE CONTROL DEVICE WITH A FAILURE ALARM FOR A VEHICLE BRAKE SYSTEM

[75] Inventor: Hiroshi Kasahara, Ueda, Japan

[73] Assignee: Nisshin Kogyo Kabushiki Kaisha, Ueda, Japan

[22] Filed: Apr. 22, 1975

[21] Appl. No.: 570,498

[30] Foreign Application Priority Data
May 7, 1974 Japan.................................. 49-50569

[52] U.S. Cl.............................. 303/6 C; 188/151 A;
188/349; 200/82 D; 303/84 A
[51] Int. Cl.²............................................. B60T 8/26
[58] Field of Search..................... 303/6 C, 6 R, 84;
188/349, 151 A, 345; 200/82 D, 82 R;
340/52 C, 52 A, 52 B

[56] References Cited
UNITED STATES PATENTS

| | | | |
|---|---|---|---|
| 3,427,416 | 2/1969 | Papin................................ | 303/84 A |
| 3,441,318 | 4/1969 | Bueler................................ | 303/6 C |
| 3,738,709 | 6/1973 | Stokes................................ | 303/6 C |
| 3,804,468 | 4/1974 | Ishikawa et al...................... | 303/6 C |
| 3,817,584 | 6/1974 | Huston et al.................... | 188/349 X |

*Primary Examiner*—Stephen G. Kunin
*Assistant Examiner*—Douglas C. Butler
*Attorney, Agent, or Firm*—Haseltine, Lake & Waters

[57] ABSTRACT

A fluid pressure device usable in a vehicle brake system which includes a dual master cylinder inserted into two mutually independent fluid lines which are connected between the front and rear wheel brakes. The device is arranged across the fluid lines between the brake master cylinder and the rear wheel brakes and includes a pair of differential pistons slidably accommodated in a cylinder bore and a balance piston slidable in the bore between the differential pistons, a pair of input fluid chambers being defined between the balance piston and the differential pistons and connected with respective upstream portions of the fluid lines while a pair of output fluid chambers are defined on the outer sides of the differential pistons and connected with the adjacent input fluid chambers through fluid control valves and with respective downstream portions of the fluid lines. The differential pistons are operated under differential pressures exerted upon opposite ends thereof to reduce the fluid pressure at the rear wheel brakes at a definite ratio relative to that at the front wheel brakes so that an improved overall braking efficiency is obtained. The balance piston is normally held in a neutral position and is moved away therefrom, in case of a fluid leakage present in either of the fluid lines, to energize an external alarm, thereby warning the operator of such failure.

6 Claims, 5 Drawing Figures

FLUID PRESSURE CONTROL DEVICE WITH A FAILURE ALARM FOR A VEHICLE BRAKE SYSTEM

BACKGROUND OF THE INVENTION

This invention is concerned generally with brake systems for automotive vehicles of the type including a dual brake master cylinder connected with two independent fluid lines and more particularly with fluid pressure control devices for such brake systems which include a brake failure alarm.

In one form of conventional brake systems of the type described, the fluid lines, extending from the respective outlet ports of the dual brake master cylinder, are connected to the brake chambers at respective pairs of front and rear wheels positioned on diagonal lines of the vehicle.

In another form, the front wheel brakes are each provided with two fluid chambers respectively connected with the fluid lines, which in turn are connected to the respective rear wheel brakes.

SUMMARY OF THE INVENTION

The present invention is intended to provide an improved fluid pressure control device with a failure alarm of simple construction and minimized size for use in vehicle brake systems of the type as described above.

According to the invention, there is provided a fluid control device of aforesaid type which includes means for automatically warning the operator of any fluid leakage possibly occurring in either of the two independent fluid lines of the associated brake system and means for adjusting the ratio of the hydraulic pressure in the front wheel brakes to that in the rear wheel brakes to a prescribed level for a maximized overall braking efficiency, the two means being arranged in complementary relationship so as to be housed in a single casing.

The above and other objects, features and advantages of the present invention will become apparent from the following description when taken in conjunction with the accompanying drawings.

DESCRIPTION OF THE PREFERRED EMBODIMENTS

Figure 1:
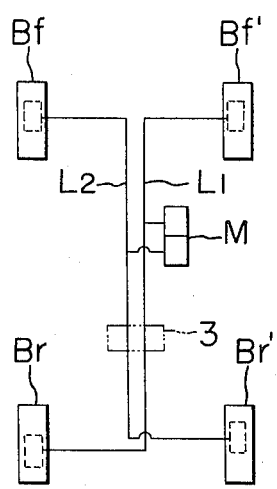
FIG. 1 is a schematic view illustrating the general arrangement of a preferred embodiment of the fluid pressure control device according to the invention.

In FIG. 1, there is shown a vehicle brake system embodying the invention which includes first and second hydraulic fluid lines $L_1$, $L_2$, respectively leading from two outlet ports of a dual type brake master cylinder M and connected to respective pairs of front and rear wheel brakes $B_f'$, $B_r$ and $B_f$, $B_r'$, located on respective diagonal lines of the vehicle.

Figure 2:
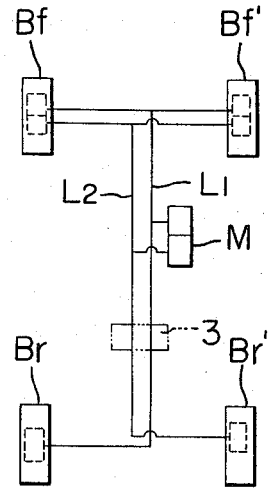
FIG. 2 is a similar schematic view illustrating the general arrangement of another preferred embodiment of the inventive device.

FIG. 2 illustrates another vehicle brake system in which each of the front wheel brakes $B_f$, $B_f'$ includes two separate fluid chambers respectively connected with first and second hydraulic brake lines $L_1$, $L_2$. In these Figures, reference numeral 3 indicates the casing body of a valve device for the brake system, arranged in the first and second fluid lines $L_1$, $L_2$ between the brake master cylinder M and the rear wheel brakes $B_r$, $B_r'$. In FIGS. 1 and 2, the fluid chambers are shown in the form of small broken-line boxes, within the larger, solid-line boxes identified as $Bf$, $Br$, etc.

Figure 3:
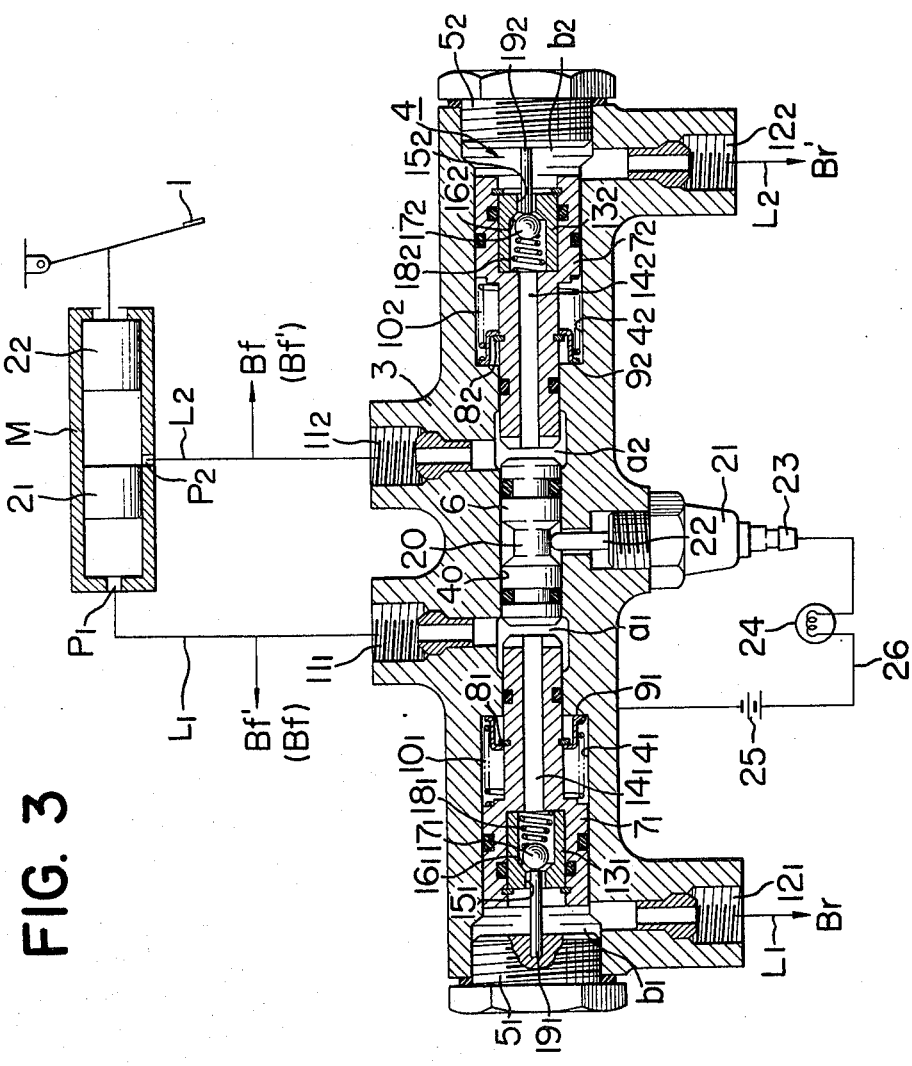
FIG. 3 is a partly schematic cross-sectional plan view of the essential parts of the device shown in FIGS. 1 and 2.

Referring to FIG. 3, the dual type master cylinder M is of known tandem structure, including an integral piston assembly comprised of a pair of front and rear pistons $2_1$, $2_2$, which are operated under the action of a brake pedal 1 to feed the fluid lines $L_1$, $L_2$ with pressure fluid such as oil under pressure, respectively through outlet ports $P_1$, $P_2$ formed in the master cylinder M.

The casing 3 of the present valve device defines therein a stepped cylinder bore 4 having a central smaller diameter portion $4_0$ and adjacent opposite end portions $4_1$, $4_2$ of larger diameter. A balance piston 6 is slidably accommodated in the smaller diameter portion $4_0$ of the bore 4 at a central part thereof and a pair of left and right differential or pressure-receiving pistons $7_1$, $7_2$ of stepped diameter, larger in diameter at their outer ends than at their inner ends, are slidably accommodated at their outer ends in the respective larger diameter portions $4_1$, $4_2$ of the bore 4, and at their inner ends in the smaller diameter bore portion $4_0$.

The cylinder bore 4 is closed at the opposite outer ends thereof by threaded plugs $5_1$, $5_2$. Slidably mounted on the differential pistons $7_1$, $7_2$ at their reduced diameter portions are seat plates $9_1$, $9_2$ which are engageable at their innermost positions with abutment rings $8_1$, $8_2$ fitted in the peripheries of the differential pistons, with pressure-adjusting springs $10_1$, $10_2$ of preset loads arranged between the seat plates $9_1$, $9_2$ and the shoulders of the differential pistons so as to bias the latter in axially outward directions.

A first and a second input fluid chamber $a_1$, $a_2$ are defined in the smaller diameter portion $4_0$ of the bore 4 between the balance piston 6 and the differential pistons $7_1$, $7_2$, which chambers are in communication with respective upstream portions of the fluid lines $L_1$, $L_2$ by way of fluid inlet ports $11_1$, $11_2$ formed in the casing 3. Also defined in the larger diameter portions $4_1$, $4_2$ of the bore 4 between the differential pistons $7_1$, $7_2$ and the thread end plugs $5_1$, $5_2$ are a first and a second output fluid chamber $b_1$, $b_2$ communicating with respective downstream portions of the fluid lines $L_1$, $L_2$ by way of fluid outlet ports $12_1$, $12_2$ formed in the casing 3.

Firmly fitted in the outer enlarged portions of the differential pistons $7_1$, $7_2$ are a pair of left and right valve boxes $13_1$, $13_2$, of which the interiors are communicable with the input fluid chambers $a_1$, $a_2$ through axial passages $14_1$, $14_2$ in the differential pistons, and with the output fluid chambers $b_1$, $b_2$ through fluid apertures $15_1$, $15_2$ in the valve boxes. Housed in these valve boxes $13_1$, $13_2$ are a pair of left and right ball valves $17_1$, $17_2$ and springs $18_1$, $18_2$ serving to bias the ball valves axially against valve seats $16_1$, $16_2$ adjacent to the fluid apertures $15_1$, $15_2$. The threaded plugs $5_1$, $5_2$ are provided with valve-opening rods $19_1$, $19_2$ extending axially inwardly from the inner end faces thereof through the respective fluid apertures $15_1$, $15_2$ so as to face the ball valves $17_1$, $17_2$, respectively.

The balance piston 6 is formed with an annular groove 20 in the periphery of the central portion thereof, and a switch unit 21, having an actuator 22 engaged in the annular groove 20, is threaded into the wall of the casing 3. The switch unit 21 has therein normally open contacts (not shown) which are closed when the switch actuator 22 has been pushed out of the annular groove 20 with an axial displacement of the balance piston 6 from its neutral position beyond a certain allowable limit. An electrical circuit 26 is formed between the casing 3 and a terminal 23 of the switch unit 21, including an alarm 24 such as a lamp or a buzzer or the like and a source 25 of electrical energy.

Description will now be made of the operation of the device described above. FIG. 3 shows the device in its normal operative state when the cylinder M is not actuated. In this state, the differential pistons $7_1$, $7_2$ are both in their normal inner positions in which the seat plates $9_1$, $9_2$ thereon are in abutting engagement with the respective inner shouldered walls of the larger diameter bores $4_1$, $4_2$ but there still remain limited recedable or inward strokes between the inner ends of the differential pistons $7_1$, $7_2$ and the opposite ends of the balance piston 6 for controllably reducing the fluid pressure in the rear wheel brakes $B_r$, $B_r'$; this will be described later. The ball valves $17_1$, $17_2$ are pushed inwardly through the valve-opening rods $19_1$, $19_2$ and held open for fluid communication between the first and the second input and output fluid chambers $a_1$, $b_1$ and $a_2$, $b_2$, respectively.

Under this situation, if the brake pedal 1 is actuated, the hydraulic output of the cylinder M is fed into the entire lengths of the fluid lines $L_1$, $L_2$ and the front and rear wheel brakes $B_f$, $B_f'$ and $B_r$, $B_r'$ are operated all at the same time. With the rise of the output fluid pressure from the master cylinder M, the fluid pressure in the input and output fluid chambers $a_1$, $a_2$, $b_1$ and $b_2$ reaches a definite level such that the differential pistons $7_1$, $7_2$, each having opposite end faces differing in effective areas from each other, are moved axially inwardly under the pressure differential acting upon the opposite end faces of the pistons $7_1$, $7_2$ against the bias of the pressure-adjusting springs $10_1$, $10_2$.

As a result, the ball valves $17_1$, $17_2$ are seated against the respective valve seats $16_1$, $16_2$ to close the fluid apertures $15_1$, $15_2$ so that the fluid pressure in the rear wheel brakes $B_r$, $B_r'$ is reduced by an amount corresponding to the increase in volume of the output fluid chambers $b_1$, $b_2$, as resulting from the inward movement of the differential pistons $7_1$, $7_2$.

As the output pressure of the brake master cylinder M further increases, the fluid pressure in the respective input fluid chambers $a_1$, $a_2$ increases to push the differential pistons $7_1$, $7_2$ at this time axially outwardly, and the ball valves $17_1$, $17_2$ are again opened through the valve-opening rods $19_1$, $19_2$ to increase the pressure in the output fluid chambers $b_1$, $b_2$. When this pressure reaches a definite level, it causes the differential pistons $7_1$, $7_2$ again to move inwardly and is accordingly reduced.

Figure 4:
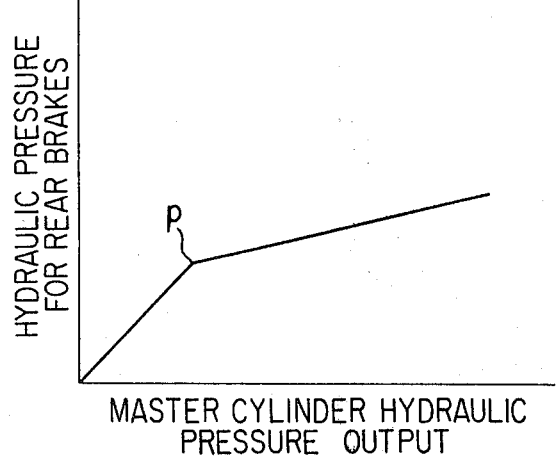
FIG. 4 shows hydraulic pressure characteristics obtainable at the rear wheel brakes according to the present invention.

With a repetition of such an operation, the brake fluid pressure in each of the rear wheel brakes $B_r$, $B_r'$ varies along the line shown in FIG. 4. The point of inflexion or break $p$ is determined by the initial load set on the adjusting springs $10_1$, $10_2$, and the rate of pressure rise after the inflexion point p is determined by the ratio of the area of one end faces of the differential pistons $7_1$, $7_2$ to that of the other end faces thereof.

In cases where there is some pressure differential in the input fluid chambers $a_1$, $a_2$, the balance piston 6 is caused thereby to move away from its neutral position toward the low pressure side within the limited spacing between the balance piston 6 and the respective differential pistons $7_1$, $7_2$ until the pressures in the respective fluid lines $L_1$, $L_2$ are equalized. With such a limited displacement of the balance piston 6, the switch actuator 22 slides only within the confines of the annular groove 20 in the balance piston 6 and never goes out therefrom.

Figure 5:
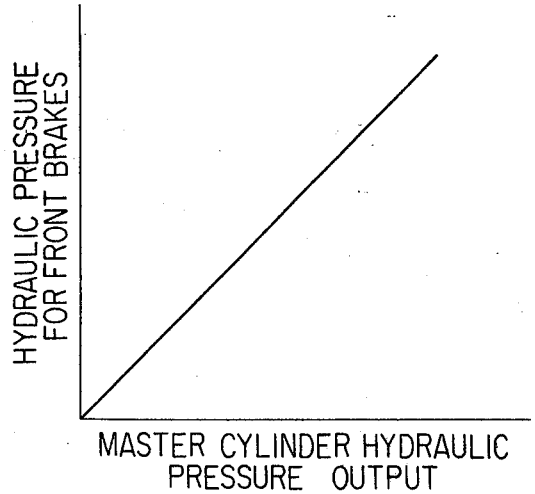
FIG. 5 shows hydraulic pressure characteristic obtainable at front wheel brakes.

On the other hand, the front wheel brakes $B_f$, $B_f'$ are directly subjected to the output pressure from the master cylinder M; in other words, the fluid pressure in the front wheel brakes $B_f$, $B_f'$ is held equal to the output pressure of the brake master cylinder M, as shown in FIG. 5.

Accordingly, the front wheel brakes $B_f$, $B_f'$ can act forcefully upon the front wheels, which are subjected to increased downward loads as occurring with a forward tilt of the vehicle upon heavy braking, whilst the rear wheel brakes $B_r$, $B_r'$ act relatively lightly upon the rear wheels, which are relieved of part of the downward loads with such a vehicle tilt. In this manner, all the wheels of the vehicle can be braked most efficiently without any dangerous skidding.

In cases where the pressures in both input fluid chambers $a_1$, $a_2$ are equal the balance piston 6 remains in its illustrated neutral position and the switch actuator 22 is in engagement with the annular groove 20 in the balance piston 6, with the contacts of the switch unit 21 being held open to keep the alarm 24 inoperative.

If, however, there exists some fluid leakage, for example in the second fluid line $L_2$, the pressure in the second input fluid chamber $a_2$ cannot be effectively raised in spite of actuation of the master cylinder M, and hence the balance piston 6 is subjected only at its left-hand end to an increased fluid pressure in the first input fluid chamber $a_1$. It is thus moved to the right, into abutting engagement with the right-hand side differential piston $7_2$, and then further moved therewith, until the piston $7_2$ abuts against the adjacent end plug $5_2$.

With this movement, the switch actuator 22 is pushed out of the annular groove 20 along its slanting end surfaces onto the associated land portion of the balance piston 6 to complete the electrical circuit 26 and thus actuate the alarm 24.

The balance piston 6, once moved to its rightmost position, remains there due to the frictional drag exerted by the smaller diameter bore $4_0$ even after the cylinder M is released to exhaust the first input fluid chamber $a_1$. Consequently, the alarm 24 continues to be on.

After the failure has been remedied, the pressures in the input and output fluid chambers $a_1$, $a_2$, and $b_1$, $b_2$ will be all raised as the cylinder M is again actuated so that the differential piston $7_2$, previously moved to its rightmost position and now subjected to the raised pressure in the second input and output chambers $a_2$, $b_2$, is caused to move to the left until the seat plate $9_2$ is brought into engagement with the inner or left-hand end wall of the larger diameter bore $4_2$. The balance piston 6 is thus returned to its neutral position, with the inward movement of the differential piston $7_2$, thereby releasing the switch actuator 22 from engagement with the annular groove 20 in the balance piston 6. As a result, the electrical circuit 26 is opened to deenergize the alarm 24, indicating that there is no longer any pressure failure in the hydraulic system.

In the event of a fluid leakage in the first fluid line $L_1$, the balance piston 6 operates in quite the same manner as described above except that the direction of operation thereof is reversed.

It will be readily appreciated from the foregoing description that, according to the present invention, the brake fluid pressure in the rear wheel brakes $B_r$, $B_r'$ is normally reduced at a prescribed ratio relative to that in the front wheel brakes $B_f$, $B_f'$ so that the respective road wheels of the vehicle are subjected to respective braking forces, corresponding to the load levels imposed thereon upon braking.

Further, in cases where there occurs a fluid leakage in either of the fluid lines $L_1$, $L_2$, the operator is warned of such trouble without fail. Additionally, as the component parts of the device performing the above functions can be housed in a single casing 3, and the balance piston 6, serving to operate the alarm 24, forms one end wall of the respective input fluid chambers $a_1$, $a_2$ and is normally maintained in its neutral position under the action of the differential pistons $7_1$, $7_2$, serving to controllably reduce the fluid pressure in the rear wheel brakes $B_r$, $B_r'$, the balance piston 6 and the differential pistons $7_1$, $7_2$ are placed in complementary relationship with each other, thus resulting in a substantial reduction in the number of the component parts and in a simplification of the construction of the entire device. For these reasons, the present device can be easily installed on a vehicle having a limited space available therefor and fabricated at a substantially reduced cost.

What is claimed is:

1. A fluid-pressure control device with a failure alarm indication, for a vehicle brake system of the type including a dual brake master cylinder having a pair of independent fluid outlet ports, a pair of fluid lines respectively extending from said outlet ports, and at least a pair of rear wheel brakes having fluid chambers respectively connected with said fluid lines, the control device comprising: a casing connected across said fluid lines midway thereof and having a stepped cylinder bore defined therein; a pair of differential pistons slidably accommodated in said bore, each having inner and outer end faces, the latter being somewhat larger than the former; said differential pistons having axially inner and outer sides; a balance piston slidably accommodated in said bore between said differential pistons; biasing means arranged between a shoulder in said bore and a portion of said differential pistons to bias the latter in an axially outward direction at a prescribed pressure; a pair of input fluid chambers defined in said bore between said balance piston and said differential pistons and communicating with respective upstream portions of said fluid lines; a pair of output fluid chambers also defined in said bore on said axially outer sides of the differential pistons and communicating with respective downstream portions of said fluid lines; said balance piston being normally held in a neutral position under the influence of inward axial movements of said differential pistons, caused by a pressure rise in said output fluid chambers; said input fluid chambers being in respective communication with said output fluid chambers through respective fluid control valves that are selectively opened and closed upon axial movement in the outward or inward direction of said differential pistons; and a switch unit mounted on said casing and operable to actuate an external alarm when said balance piston is axially displaced from the neutral position beyond a definite limit, wherein said communication between the input and the output fluid chambers is by way of substantially axial fluid passages in said differential pistons, said passages incorporating said control valves.

2. The control device as defined in claim 1, further comprising seat plates disposed about said differential pistons for adjustably supporting said biasing means.

3. The control device as defined in claim 1, wherein said balance piston has a groove in a central portion thereof, and further comprising an actuator in said switch unit, biased into said groove, the latter being wide enough to allow the displacement of said balance piston within the definite limit without moving said actuator.

4. The control device as defined in claim 3, further comprising means to produce frictional drag in said cylinder bore for delay the movements of said balance piston.

5. The control device as defined in claim 1, further comprising plug means at the outer ends of said casing and said cylinder bore, for cleaning and adjustment purposes.

6. The control device as defined in claim 5, further comprising valve-operating rods contacted by said plug means and operatively associated with said control valves.

* * * * *